(12) United States Patent
Tsunoya et al.

(10) Patent No.: US 10,994,478 B2
(45) Date of Patent: May 4, 2021

(54) METHOD FOR PRODUCING THREE-DIMENSIONAL SHAPED ARTICLE

(71) Applicant: Seiko Epson Corporation, Tokyo (JP)

(72) Inventors: Akihiko Tsunoya, Okaya (JP); Eiji Okamoto, Matsumoto (JP)

(73) Assignee: Seiko Epson Corporation

( * ) Notice: Subject to any disclaimer, the term of this patent is extended or adjusted under 35 U.S.C. 154(b) by 194 days.

(21) Appl. No.: 16/127,752

(22) Filed: Sep. 11, 2018

(65) Prior Publication Data

US 2019/0077075 A1    Mar. 14, 2019

(30) Foreign Application Priority Data

Sep. 12, 2017 (JP) .............................. JP2017-174985

(51) Int. Cl.
| | | |
|---|---|---|
| *B29C 64/165* | (2017.01) | |
| *B29C 64/295* | (2017.01) | |
| *B33Y 10/00* | (2015.01) | |
| *B29C 71/02* | (2006.01) | |
| *B29C 71/04* | (2006.01) | |
| *B29C 64/264* | (2017.01) | |

(Continued)

(52) U.S. Cl.
CPC ............ *B29C 64/165* (2017.08); *B22F 3/008* (2013.01); *B29C 64/264* (2017.08); *B29C 64/295* (2017.08); *B29C 71/02* (2013.01); *B29C 71/04* (2013.01); *B33Y 10/00* (2014.12); *B33Y 40/00* (2014.12); *B29C 2035/0822* (2013.01); *B29C 2071/022* (2013.01)

(58) Field of Classification Search
CPC ..... B29C 64/165; B29C 64/295; B29C 71/04; B29C 71/02; B29C 64/264; B29C 2071/022; B29C 2035/0822; B29C 64/379; B22F 3/008; B33Y 40/00; B33Y 10/00

See application file for complete search history.

(56) References Cited

U.S. PATENT DOCUMENTS 3,953,562 A    4/1976    Hait et al.
4,281,420 A *  8/1981    Raab .................... A61F 2/00
                                              128/898

(Continued)

FOREIGN PATENT DOCUMENTS

CN    106994731 A    8/2017
JP    2002-067172 A    3/2002

*Primary Examiner* — Jacob T Minskey
*Assistant Examiner* — Caroline Montiel
(74) *Attorney, Agent, or Firm* — Harness, Dickey & Pierce, P.L.C.

(57) ABSTRACT

Provided is a method for producing a three-dimensional shaped article in which the three-dimensional shaped article is produced by stacking a plurality of layers, and the method includes a layer formation step of forming layers by using a composition that contains a powder, a solvent, and a binder which constitute the three-dimensional shaped article, a solvent removal step of removing the solvent contained in the layers, a thermal treatment step of applying heat at a temperature equal to or higher than a glass transition temperature of the binder to the layers obtained by performing the layer formation step and the solvent removal step, and a heating step of carrying out at least one of degreasing and sintering with respect to a stack of the three-dimensional shaped article that has been thermally treated in the thermal treatment step.

3 Claims, 11 Drawing Sheets

(51) Int. Cl.
  *B22F 3/00*    (2021.01)
  *B33Y 40/00*   (2020.01)
  *B29C 35/08*   (2006.01)

(56) References Cited

U.S. PATENT DOCUMENTS

| | | | | |
|---|---|---|---|---|
| 5,382,251 | A * | 1/1995 | Hood | A61B 17/8847 |
| | | | | 606/99 |
| 6,220,703 | B1 * | 4/2001 | Evans | B29C 51/10 |
| | | | | 351/159.56 |
| 2002/0062909 | A1 * | 5/2002 | Jang | B33Y 30/00 |
| | | | | 156/155 |
| 2002/0162642 | A1 * | 11/2002 | Walker, Sr. | B22C 7/02 |
| | | | | 164/516 |
| 2003/0180171 | A1 * | 9/2003 | Artz | B22F 1/0059 |
| | | | | 419/2 |
| 2006/0119017 | A1 * | 6/2006 | Tang | C04B 35/6316 |
| | | | | 264/642 |
| 2013/0307175 | A1 * | 11/2013 | Tang | B29C 67/242 |
| | | | | 264/42 |
| 2017/0001558 | A1 * | 1/2017 | Kwon | B60Q 5/008 |
| 2017/0129012 | A1 | 5/2017 | Ishida et al. | |
| 2018/0147627 | A1 * | 5/2018 | Nakamura | B23K 15/0086 |
| 2018/0154437 | A1 * | 6/2018 | Mark | B33Y 10/00 |

* cited by examiner

METHOD FOR PRODUCING THREE-DIMENSIONAL SHAPED ARTICLE

This application claims priority under 35 U.S.C. § 119 to Japanese Patent Application No. 2017-174985 filed on Sep. 12, 2017, the entire disclosure of which is expressly incorporated by reference herein.

BACKGROUND

1. Technical Field

The present invention relates to a method for producing a three-dimensional shaped article.

2. Related Art

In the related art, various production methods for producing a three-dimensional shaped article have been implemented. Among them, there is a method for producing a three-dimensional shaped article in which a plurality of layers are stacked to produce a three-dimensional shaped article.

For example, JP-A-2002-67172 discloses a method for producing a three-dimensional shaped article, in which the three-dimensional shaped article is produced by selectively irradiating a photocurable resin with light to form a plurality of cured resin layers.

A three-dimensional shaped article can be made of various materials, for example, in some cases, the three-dimensional shaped article is formed in a shape with a metal, a ceramic, or the like, and is sintered or degreased after the shape of the three-dimensional shaped article is completed. In addition, in a case of producing a three-dimensional shaped article by stacking a plurality of layers using a composition that contains a powder, a solvent, and a binder which constitute the three-dimensional shaped article, there are some cases where, due to volatilization of the solvent or the like, distribution of the solvent and the binder is biased before degreasing or sintering in each layer, and stress is generated in a stack of the three-dimensional shaped article. This is because a removal rate (volatilization rate or the like) of the solvent in each layer is different (biased) between an edge portion (fast) and a center portion (slow) of each layer. In a case where the distribution of the solvent and the binder is biased due to bias of the removal rate of the solvent, there are some cases where stress is generated from the edge portion toward the center portion in each layer within the stack of the three-dimensional shaped article, and in a case where degreasing or sintering is carried out in such a state, there are some cases where warpage or the like caused by the stress is generated in the stack of the three-dimensional shaped article, and deformation occurs.

SUMMARY

An advantage of some aspects of the invention is to suppress deformation of a stack of a three-dimensional shaped article due to degreasing or sintering in a case of producing a three-dimensional shaped article by stacking a plurality of layers.

According to an aspect of the invention, there is provided a method for producing a three-dimensional shaped article in which the three-dimensional shaped article is produced by stacking a plurality of layers, the method including: forming the layers by using a composition that contains a powder, a solvent, and a binder which constitute the three-dimensional shaped article; removing the solvent contained in the layers; performing a thermal treatment by applying heat at a temperature equal to or higher than a glass transition temperature of the binder to the layers obtained by performing the forming of the layers and the removing of the solvent; and performing heating to carry out at least one of degreasing and sintering with respect to a stack of the three-dimensional shaped article that has been thermally treated in the performing of the thermal treatment.

In this configuration, before the performing of the heating to carry out at least one of the degreasing and the sintering, the thermal treatment is performed to apply heat to the layers constituting the stack of the three-dimensional shaped article. As a result, even in a case where distribution of the solvent and the binder is biased in the removing of the solvent, it is possible to reduce or eliminate the bias (stress caused by the bias) by the performing of the thermal treatment. Therefore, it is possible to reduce or eliminate stress in the stack of the three-dimensional shaped article before carrying out the degreasing or the sintering, and to prevent the stack of the three-dimensional shaped article from being deformed due to the performing of the heating (degreasing or sintering).

In the method for producing a three-dimensional shaped article, in the performing of the thermal treatment, heat at a temperature equal to or higher than the glass transition temperature of the binder may be applied to the stack of the three-dimensional shaped article formed of the plurality of layers obtained by performing the forming of the layers and the removing of the solvent.

In this configuration, in the performing of the thermal treatment, heat is applied to the stack of the three-dimensional shaped article formed of a plurality of layers. Thus, it is possible to reduce a number of times of performing the thermal treatment, and to increase a production efficiency (production rate) of the three-dimensional shaped article.

In the method for producing a three-dimensional shaped article, in the performing of the thermal treatment, heat at a temperature equal to or lower than a softening point of the binder may be applied.

In this configuration, in the performing of the thermal treatment, heat at a temperature equal to or lower than the softening point of the binder is applied. Thus, it is possible to suppress deformation of the stack of the three-dimensional shaped article which is caused by softening of the binder due to the performing of the thermal treatment.

In the method for producing a three-dimensional shaped article, in a case where a plurality of types of the binders are contained in the composition, in the performing of the thermal treatment, heat at a temperature equal to or higher than the highest glass transition temperature among the binders may be applied.

In this configuration, even in a case where a plurality of types of binders are contained, it is possible to particularly effectively reduce or eliminate bias in distribution of the binders.

In the method for producing a three-dimensional shaped article, the removing of the solvent may be performed every time the forming of the layers is performed once.

In this configuration, the forming of the layers is performed every time the removing of the solvent is performed once. Thus, it is possible to particularly effectively reduce bias in distribution of the binder due to the removing of the solvent.

In the method for producing a three-dimensional shaped article, the removing of the solvent may be performed after the forming of the layers is performed a plurality of times.

In this configuration, the forming of the layers is performed after the removing of the solvent is performed a plurality of times. Thus, it is possible to increase a production efficiency (production rate) of the three-dimensional shaped article.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments according to the invention will be described below with reference to the drawings.

FIGS. 1 to 4 are schematic configuration diagrams showing a configuration of a production apparatus for a three-dimensional shaped article according to an embodiment of the invention.

Figure 1:
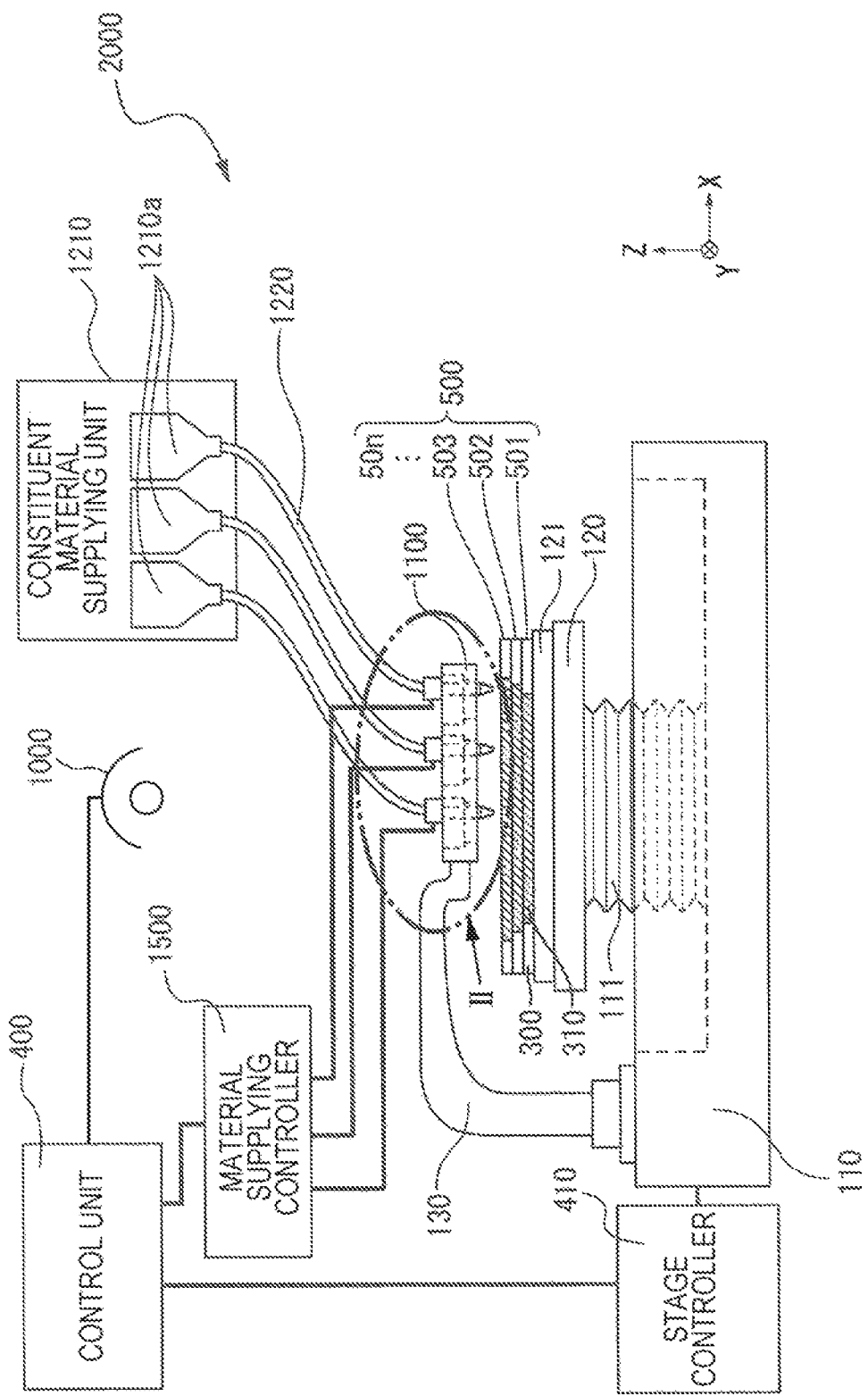
FIG. 1 is a schematic configuration diagram showing a configuration of a production apparatus for a three-dimensional shaped article according to an embodiment of the invention.
Figure 2:
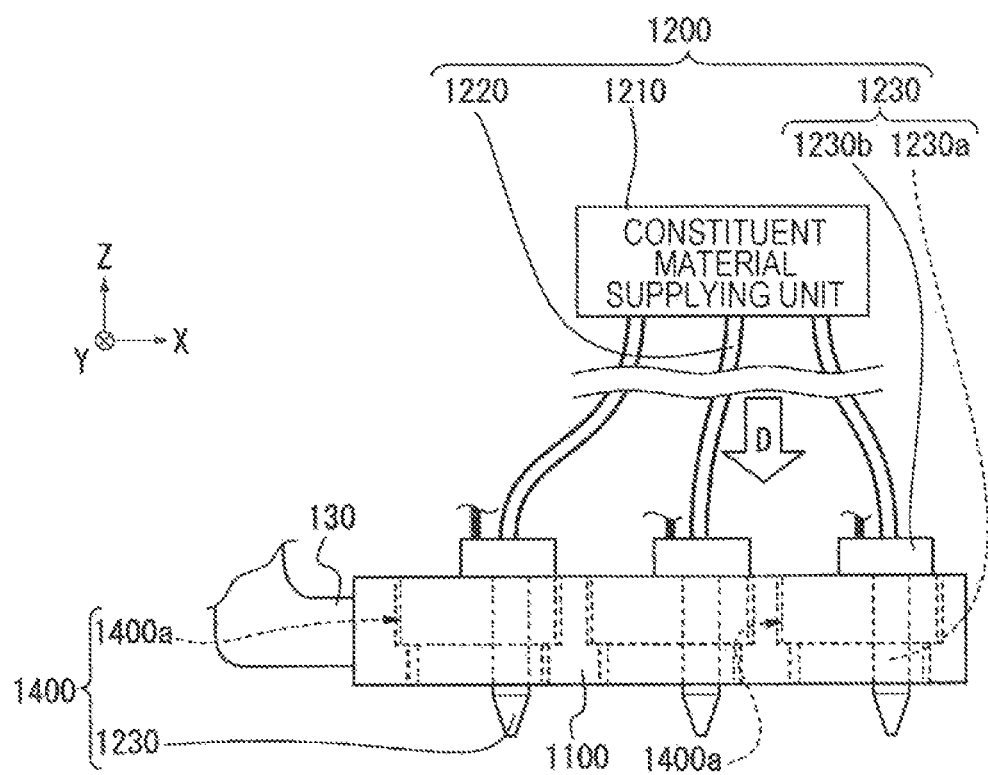
FIG. 2 is an enlarged view of a portion II shown in FIG. 1.

In these cases, the production apparatus for a three-dimensional shaped article of the present embodiment is provided with two types of material supplying sections (head bases). Among them, FIGS. 1 and 2 are diagrams showing only one material supplying section (material supplying section for supplying a constituent material of a three-dimensional shaped article). In addition, FIGS. 3 and 4 are diagrams showing only another material supplying section (a material supplying section for supplying a support layer forming material for forming the support layer that supports a three-dimensional shaped article at the time of forming the three-dimensional shaped article).

In the specification, "three-dimensional shaping" means forming a so-called stereoscopically shaped article, and is, for example, intended to include also forming a flat plate shape, the so-called two-dimensional shape, into a shape in which a thickness is made therefor. Further, "support" is intended to include not only providing support from a lower side, but also providing support from a lateral side and in some cases providing support from an upper side.

Further, the constituent material of this example is a three-dimensional shaping paste (pasty composition) that contains powder particles, a solvent, and a binder that is soluble in the solvent which constitute a three-dimensional shaped article. The support layer forming material of this example is a three-dimensional shaping paste (pasty composition) that contains support layer forming particles, a solvent, and a binder that is soluble in the solvent.

Figure 3:
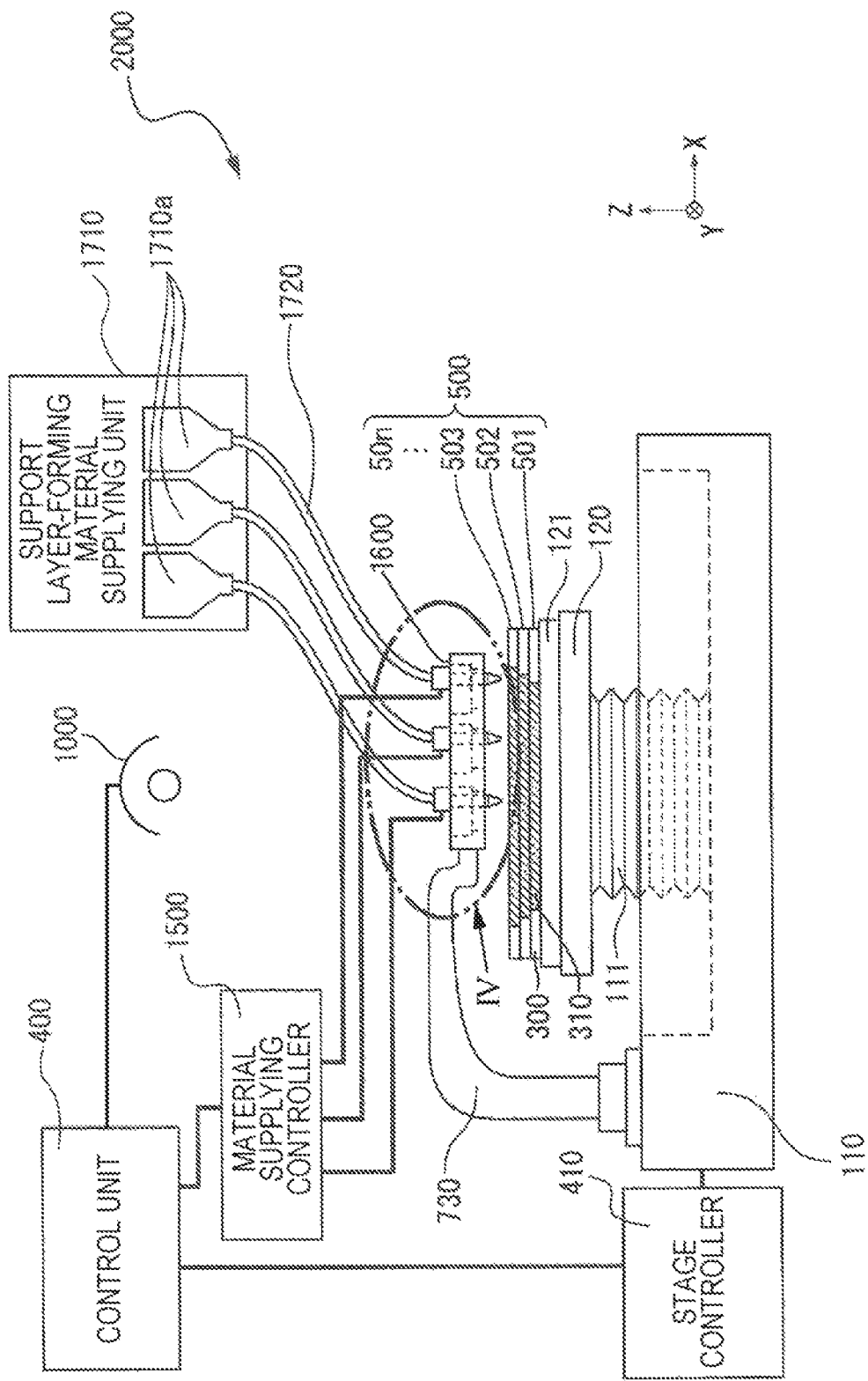
FIG. 3 is a schematic configuration diagram showing a configuration of a production apparatus for a three-dimensional shaped article according to an embodiment of the invention.
Figure 4:
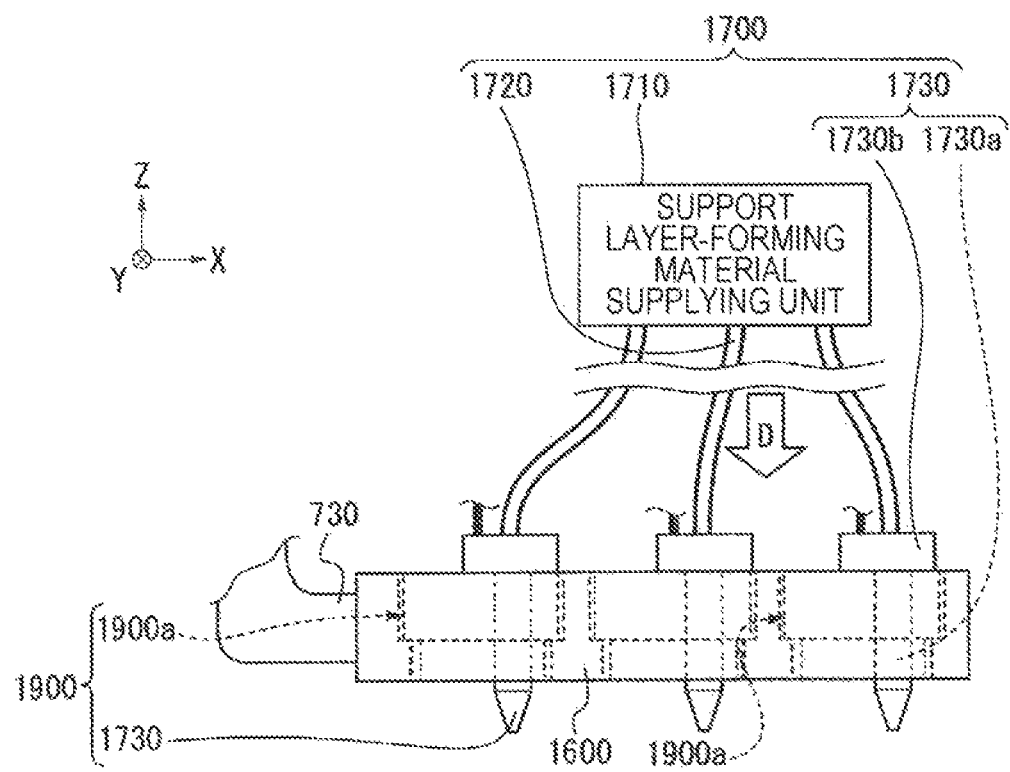
FIG. 4 is an enlarged view of a portion IV shown in FIG. 3.

A three-dimensional shaped article production apparatus 2000 (hereinafter referred to as a formation apparatus 2000) shown in FIGS. 1 and 3 is provided with a base 110 and a stage 120 that is configured such that a drive device 111 as drive means provided in the base 110 allows the stage 120 to move in the X, Y, or Z direction, or to be driven along a rotational direction about the Z axis.

As shown in FIGS. 1 and 2, there is provided a head base support 130 having one end portion fixed to the base 110 and the other end portion in which a head base 1100 is held and fixed, the head base 1100 holding a plurality of head units 1400, each head unit 1400 being provided with a constituent material discharging section 1230 for discharging the constituent material.

As shown in FIGS. 3 and 4, there is provided a head base support 730 having one end portion fixed to the base 110 and the other end portion in which a head base 1600 is held and fixed, the head base 1600 holding a plurality of head units 1900, each head unit 1900 being provided with a support layer forming material discharging section 1730 for discharging a support layer forming material that supports a three-dimensional shaped article.

In these cases, the head base 1100 and the head base 1600 are provided in parallel in the XY plane.

It is noted that the constituent material discharging section 1230 and the support layer forming material discharging section 1730 have the same configuration. However, the invention is not limited to such a configuration.

On the stage 120, layers 501, 502 and 503 are formed in the process of forming a three-dimensional shaped article 500. A thermal energy is irradiated by an electromagnetic wave irradiating section 1000 or the like for forming the three-dimensional shaped article 500. Thus, in order to provide protection against the heat of the stage 120, a sample plate 121 having heat resistance may be used and the three-dimensional shaped article 500 may be formed on the sample plate 121. The sample plate 121 of the present embodiment is the one made of metal that is robust and easy to produce. However, by using, for example, a ceramic plate as the sample plate 121, it is possible to obtain high heat resistance. Also, the ceramic plate can also exhibit low reactivity with the constituent material of the three-dimensional shaped article to be degreased, sintered, or the like, thereby preventing the three-dimensional shaped article 500 from being deteriorated. In FIGS. 1 and 3, three layers of layers 501, 502, and 503 are illustrated for convenience of description. However, stacking is performed until a desired shape of the three-dimensional shaped article 500 is obtained (until layer 50*n* is stacked in FIGS. 1 and 3).

In this case, each of the layers 501, 502, 503, . . . , 50*n* includes the support layer 300 formed of the support layer forming material which is discharged from the support layer forming material discharging section 1730, and the constituent layer 310 formed of the constituent material which is discharged from the constituent material discharging section 1230.

It is noted that the formation apparatus 2000 of the present embodiment is a production apparatus for a three-dimensional shaped article which is capable of forming the layers 501, 502, 503, . . . , 50*n*, and a plurality of layers by using a support layer forming material in addition to the constituent material of the three-dimensional shaped article 500. However, the formation apparatus 2000 may be a production apparatus for a three-dimensional shaped article which is capable of forming the plurality of layers without using the support layer forming material.

Further, FIG. 2 is a conceptual diagram enlarging the portion II showing the head base 1100 shown in FIG. 1. As shown in FIG. 2, the head base 1100 holds a plurality of head units 1400. Although will be described in detail later, one head unit 1400 is configured such that the constituent material discharging section 1230 provided in the constituent material supplying device 1200 is held by a holding tool 1400*a*. The constituent material discharging section 1230 includes a discharging nozzle 1230*a*, and a discharging drive section 1230*b* for discharging the constituent material from the discharging nozzle 1230*a* by a material supplying controller 1500.

FIG. 4 is a conceptual diagram enlarging the portion IV showing the head base 1600 shown in FIG. 3. As shown in FIG. 4, the head base 1600 holds a plurality of head units 1900. The head unit 1900 is configured such that the support layer forming material discharging section 1730 provided in a support layer forming material supplying device 1700 is held by a holding tool 1900*a*. The support layer forming material discharging section 1730 includes a discharging nozzle 1730*a*, and a discharging drive section 1730*b* for discharging the support layer forming material from the discharging nozzle 1730*a* by the material supplying controller 1500.

As shown in FIGS. 1 and 2, the constituent material discharging section 1230 is connected by a supplying tube 1220 to the constituent material supplying unit 1210 that contains a constituent material corresponding to each of the head units 1400 held in the head base 1100. A predetermined amount of constituent material is supplied from the constituent material supplying unit 1210 to the constituent material discharging section 1230. In the constituent material supplying unit 1210, the constituent material of the three-dimensional shaped article 500 shaped by the formation apparatus 2000 according to the present embodiment is contained in a constituent material container 1210*a*, and the individual constituent material containers 1210*a* are connected by the supplying tubes 1220 to the individual constituent material discharging sections 1230. As such, by providing the individual constituent material containers 1210*a*, a plurality of different types of materials can be supplied from the head base 1100.

As shown in FIGS. 3 and 4, the support layer forming material discharging section 1730 is connected by a supplying tube 1720 to a support layer forming material supplying unit 1710 that contains support layer forming material corresponding to each of the head units 1900 held in the head base 1600. A predetermined amount of support layer forming material is supplied from the support layer forming material supplying unit 1710 to the support layer forming material discharging section 1730. In the support layer forming material supplying unit 1710, the support layer forming material that constitutes the support layer at the time of shaping the three-dimensional shaped article 500 is contained in a support layer forming material container 1710*a*, and the individual support layer forming material containers 1710*a* are connected by the supplying tubes 1720 to the individual support layer forming material discharging sections 1730. As such, by providing the individual support layer forming material containers 1710*a*, a plurality of different types of support layer forming materials can be supplied from the head base 1600.

Each of the three-dimensional shaping pastes as the constituent material and the support layer forming material used in the formation apparatus 2000 of this example will be described in detail later.

The formation apparatus 2000 includes a control unit 400 as control means for controlling the above-described stage 120, the constituent material discharging section 1230 provided in the constituent material supplying device 1200, and the support layer forming material discharging section 1730 provided in the support layer forming material supplying device 1700, based on the data for shaping the three-dimensional shaped article output from a data output device such as a personal computer (not shown). Although not shown, the control unit 400 further includes a controller for controlling the stage 120 and the constituent material discharging section 1230 such that they are driven and operated in a cooperative manner, and for controlling the stage 120 and the support layer forming material discharging section 1730 such that they are driven and operated in a cooperative manner.

For the stage 120 movably provided on the base 110, a signal for controlling start and stop of movement, movement direction, movement amount, movement speed, and the like of the stage 120 is generated in a stage controller 410 based on a control signal from the control unit 400, and sent to the drive device 111 provided on the base 110, thereby causing the stage 120 to move in the X, Y, or Z direction shown in the drawing. In the constituent material discharging section 1230 provided in the head unit 1400, a signal for controlling an amount of the material discharged from the discharging nozzle 1230*a* and the like in the discharging drive section 1230*b* provided in the constituent material discharging section 1230 is generated in the material supplying controller 1500 based on a control signal from the control unit 400, and the generated signal causes a predetermined amount of the constituent material to be discharged from the discharging nozzle 1230*a*.

Similarly, in the support layer forming material discharging section 1730 provided in the head unit 1900, a signal for controlling an amount of the material discharged from the discharging nozzle 1730*a* and the like in the discharging drive section 1730*b* provided in the support layer forming material discharging section 1730 is generated in the material supplying controller 1500 based on a control signal from the control unit 400, and the generated signal causes a predetermined amount of the support layer forming material to be discharged from the discharging nozzle 1730*a*.

In addition, the electromagnetic wave irradiating section 1000 is also configured to be capable of irradiating electromagnetic waves toward the layers 501, 502, 503, . . . , 50*n* of the three-dimensional shaped article 500 formed on the stage 120 (sample plate 121) under control of the control unit 400.

Next, the head unit 1400 will be described in more detail. It is noted that the head unit 1900 has the same configuration as the head unit 1400. Therefore, a detailed description for the configuration of the head unit 1900 will be omitted.

Figure 5:
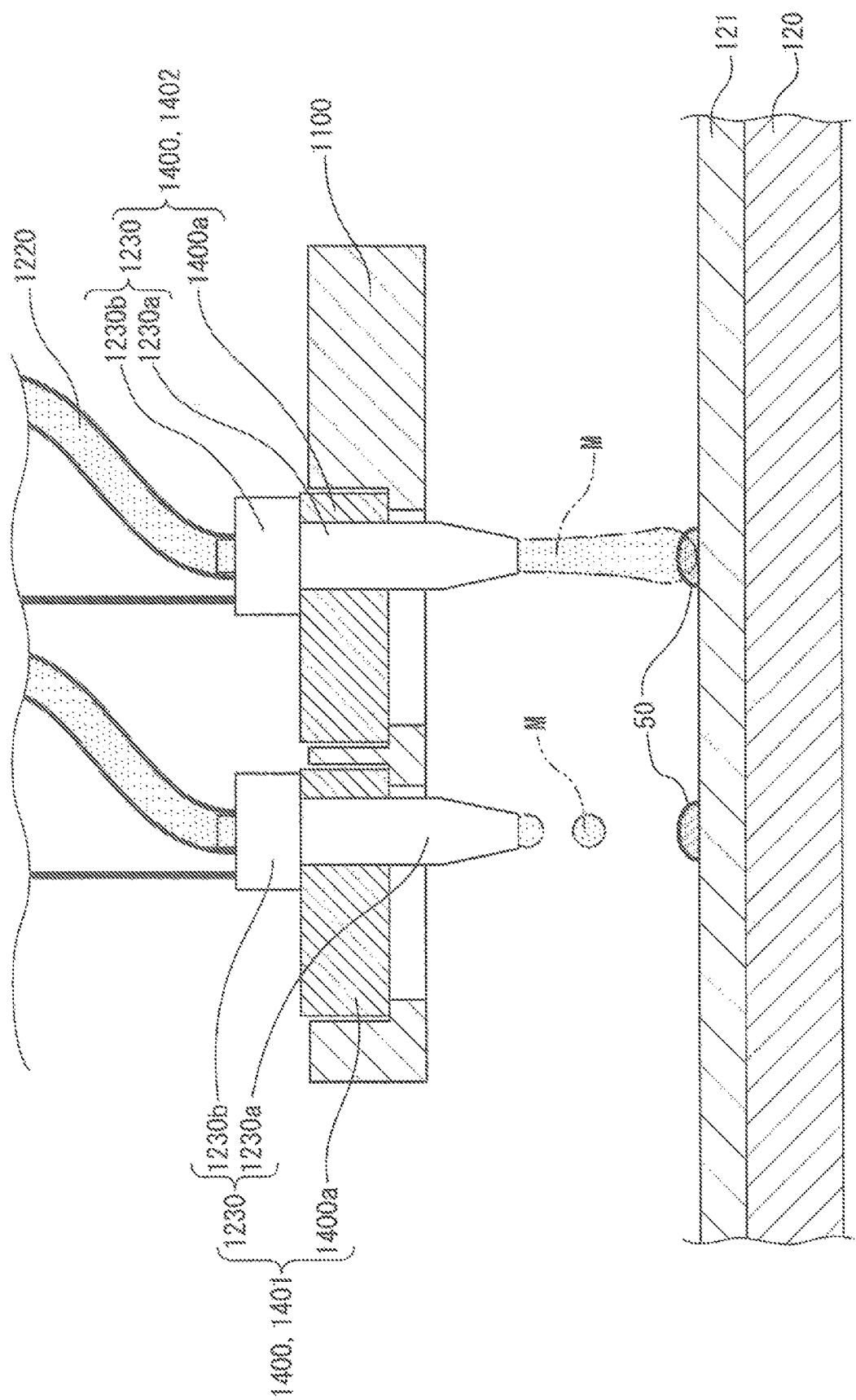
FIG. 5 is a schematic perspective view of a head base according to an embodiment of the invention.
Figure 6:
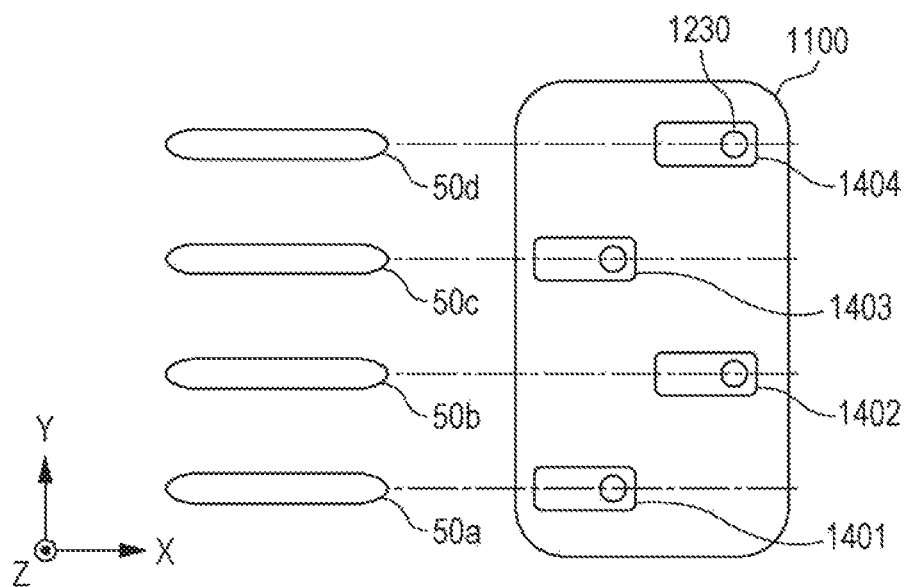
FIG. 6 is a plan view conceptually explaining a relationship between a disposition of head units and a formation form of a three-dimensional shaped article according to an embodiment of the invention.
Figure 7:
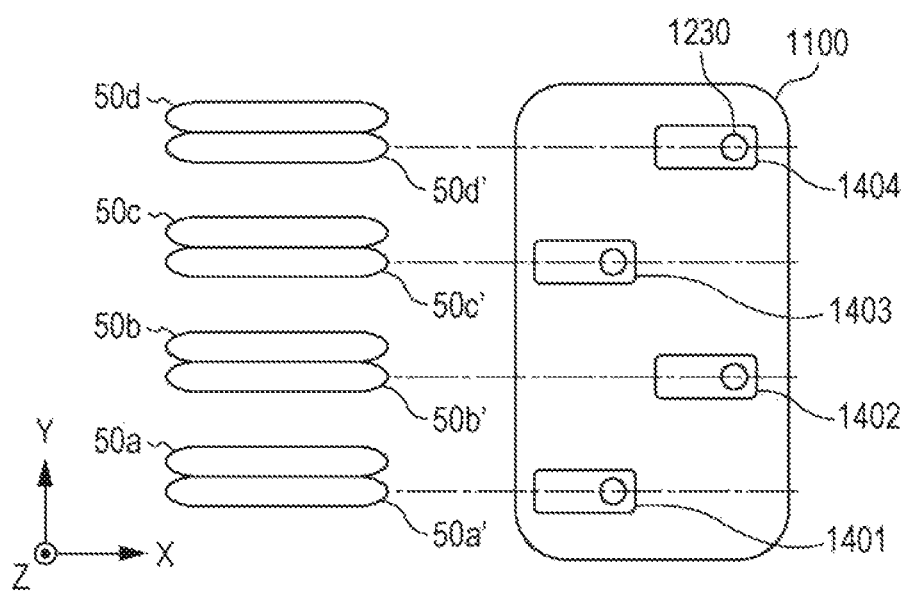
FIG. 7 is a plan view conceptually explaining the relationship between the disposition of head units and the formation form of a three-dimensional shaped article according to an embodiment of the invention.
Figure 8:
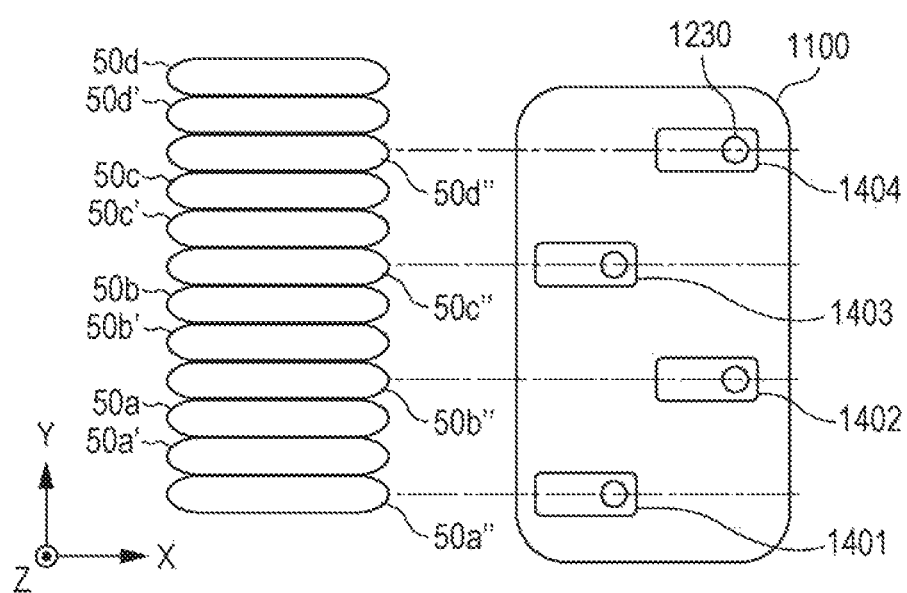
FIG. 8 is a plan view conceptually explaining the relationship between the disposition of head units and the formation form of a three-dimensional shaped article according to an embodiment of the invention.

FIG. 5 and FIGS. 6 to 8 show an example of the holding form for a plurality of the head units 1400 and the constituent material discharging sections 1230 held in the head base 1100. Among them, FIGS. 6 to 8 show an external view of the head base 1100 as seen from the direction of an arrow D shown in FIG. 2.

As shown in FIG. 5, the plurality of head units 1400 are held in the head base 1100 by fixing means (not shown). As shown in FIGS. 6 to 8, the head base 1100 of the formation apparatus 2000 according to the present embodiment is provided with the head units 1400 in which, as seen from the bottom of the drawing, four units of a head unit 1401 at the first row, a head unit 1402 at the second row, a head unit 1403 at the third row, and a head unit 1404 at the fourth row are disposed in a staggered (alternating) manner. As shown in FIG. 6, the constituent material is discharged from each of the head units 1400 to form constituent layer constituting portions 50 (constituent layer constituting portions 50*a*, 50*b*, 50*c*, and 50*d*) while moving the stage 120 in the X direction with respect to the head base 1100. The procedure for forming the constituent layer constituting portions 50 will be described later.

Although not shown, the constituent material discharging section 1230 provided in each of the head units 1401 to 1404 is configured to be connected, via the discharging drive section 1230*b* and by the supplying tube 1220, to the constituent material supplying unit 1210.

As shown in FIG. 5, in the constituent material discharging section 1230, a material M, which is the constituent material (pasty composition) of the three-dimensional shaped article, is discharged from the discharging nozzle 1230*a* onto the sample plate 121 placed on the stage 120. In the head unit 1401, a discharging form in which the material M is discharged in a droplet shape is illustrated, and in the head unit 1402, a discharging form in which the material M is supplied in a continuous body shape is illustrated. The discharging form for the material M may be in a droplet shape or in a continuous body shape, and in the present embodiment, the description is made for a case where the material M is discharged in a droplet shape.

The material M discharged in a droplet shape from the discharging nozzle 1230*a* flies in almost the gravity direction and lands on the sample plate 121. The stage 120 moves and the constituent layer constituting portions 50 are formed by the landed material M. The assembly of the constituent layer constituting portions 50 is formed as constituent layers 310 (see FIG. 1) of the three-dimensional shaped article 500 to be formed on the sample plate 121.

Next, the procedure for forming the constituent layer constituting portions 50 will be described with reference to FIGS. 6 to 8, and FIGS. 9 and 10.

Figure 9:
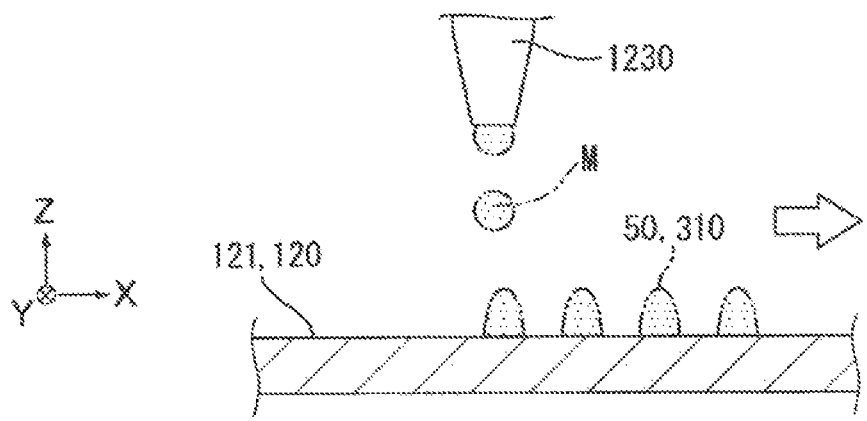
FIG. 9 is a schematic diagram conceptually explaining the formation form of a three-dimensional shaped article.
Figure 10:
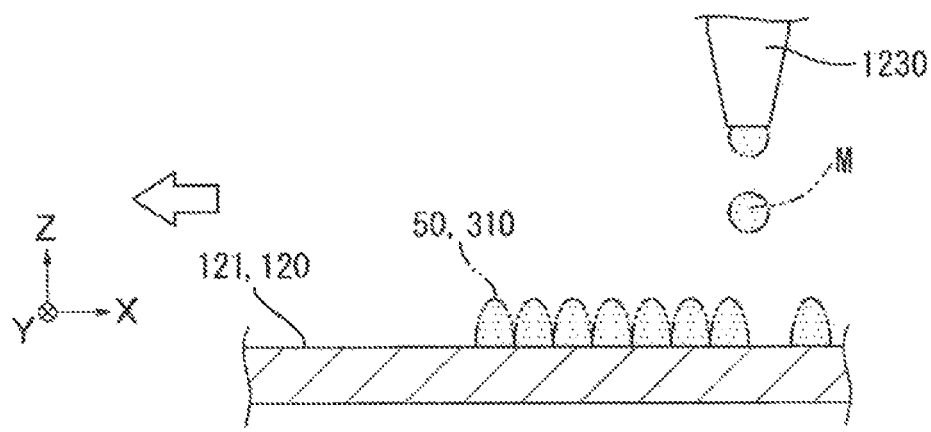
FIG. 10 is a schematic diagram conceptually explaining the formation form of a three-dimensional shaped article.

FIGS. 6 to 8 are plan views conceptually explaining the relationship between the disposition of the head units 1400 and the formation form of the constituent layer constituting portions 50 of the present embodiment. FIGS. 9 and 10 are side views conceptually showing the formation form of the constituent layer constituting portions 50.

First, in a case where the stage 120 moves in the +X direction, the material M is discharged in a droplet shape from a plurality of the discharging nozzles 1230*a*, and the material M is disposed at predetermined positions of the sample plate 121, thereby forming the constituent layer constituting portions 50.

More specifically, first, as shown in FIG. 9, the material M is disposed at a fixed interval at predetermined positions of the sample plate 121 from the plurality of discharging nozzles 1230*a* while moving the stage 120 in the +X direction.

Next, as shown in FIG. 10, the material M is newly disposed so as to fill the spaces between the materials M disposed at a fixed interval while moving the stage 120 in the −X direction.

However, a configuration where the material M is disposed so as to overlap each other (so as not to be spaced apart) at predetermined positions of the sample plate 121 from the plurality of discharging nozzles 1230*a* while moving the stage 120 in the +X direction (such configuration indicates not a configuration in which the constituent layer constituting portions 50 are formed by a reciprocating movement of the stage 120 in the X direction but a configuration in which the constituent layer constituting portions 50 are formed by only one directional movement of the stage 120 in the X direction) may be adopted.

By forming the constituent layer constituting portions 50 as described above, as shown in FIG. 6, the constituent layer constituting portions 50 (constituent layer constituting portions 50*a*, 50*b*, 50*c*, and 50*d*) are formed along one line in the X direction (a first line in the Y direction) of the respective head units 1401, 1402, 1403, and 1404.

Next, in order to form constituent layer constituting portions 50' (constituent layer constituting portions 50*a*', 50*b*', 50*c*', and 50*d*') along a second line in the Y direction of the respective head units 1401, 1402, 1403, and 1404, the head base 1100 is allowed to move in the −Y direction. In a case where the pitch between nozzles is set as P, the amount of movement is such that a movement is made in the −Y direction by P/n (n is a natural number) pitch. In this example, description is made assuming that n is 3.

By performing the same operation as that described above as shown in FIGS. 9 and 10, the constituent layer constituting portions 50' (constituent layer constituting portions 50*a*', 50*b*', 50*c*' and 50*d*') as shown in FIG. 7 are formed along the second line in the Y direction.

Next, in order to form constituent layer constituting portions 50" (constituent layer constituting portions 50*a*", 50*b*", 50*c*", and 50*d*") along a third line in the Y direction of the respective head units 1401, 1402, 1403, and 1404, the head base 1100 is allowed to move in the −Y direction. The amount of movement is such that a movement is made in the −Y direction by P/3 pitch.

By performing the same operation as that described above as shown in FIGS. 9 and 10, the constituent layer constituting portions 50" (constituent layer constituting portions 50*a*", 50*b*", 50*c*", and 50*d*") as shown in FIG. 8 can be formed along the third line in the Y direction, thereby obtaining the constituent layer 310.

Further, for the material M that is discharged from the constituent material discharging section 1230, it is also possible to cause one unit, or two or more units of the head units 1401, 1402, 1403, and 1404 to discharge and supply the constituent material that is different from another head unit. Thus, by using the formation apparatus 2000 according to the present embodiment, it is possible to obtain a three-dimensional shaped article formed of different materials.

In the layer 501 that is a first layer, before or after forming the constituent layer 310 as described above, it is possible to form the support layer 300, in a similar manner, by discharging the support layer forming material from the support layer forming material discharging section 1730. Also in a case where layers 502, 503, ..., 50n are formed on the layer 501 such that they are stacked on top of each other, it is possible to form the constituent layer 310 and the support layer 300 in a similar manner.

The number and disposition of the head units 1400 and 1900 provided in the formation apparatus 2000 according to the present embodiment described above are not limited to the number and disposition described above. For example, FIGS. 11 and 12 schematically illustrate an example of another disposition for the head units 1400 disposed in the head base 1100.

Figure 11:
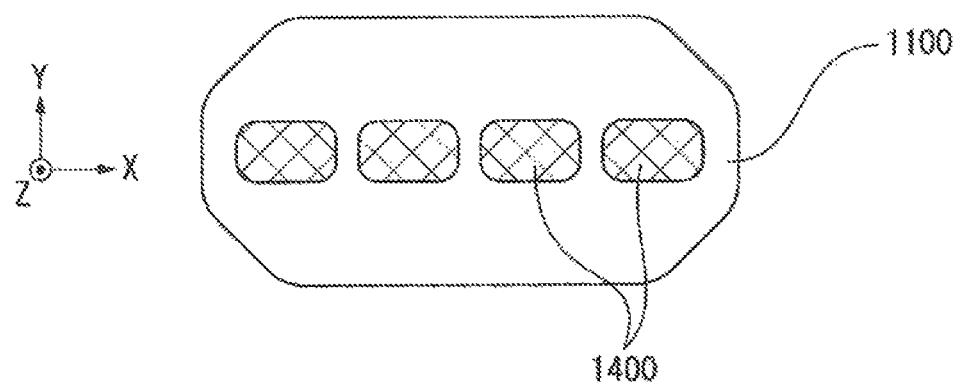
FIG. 11 is a schematic diagram showing an example of another disposition of head units disposed on a head base.
Figure 12:
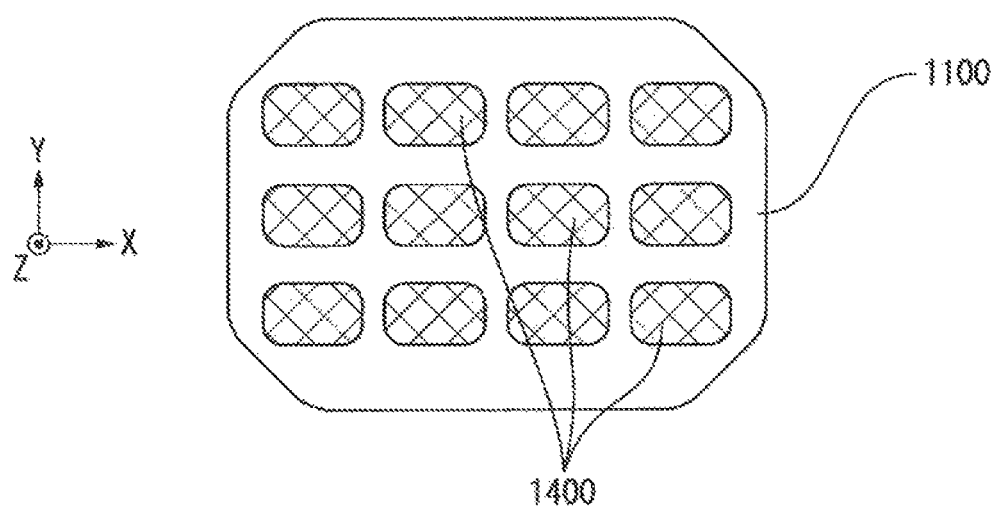
FIG. 12 is a schematic diagram showing an example of another disposition of head units disposed on a head base.

FIG. 11 shows a configuration obtained by juxtaposing a plurality of head units 1400 in the head base 1100 in the X-axis direction. FIG. 12 shows a configuration by disposing the head units 1400 in the head base 1100 in a lattice pattern. In any case, the number of the head units to be disposed is not limited to the illustrated examples.

Next, the respective three-dimensional shaping pastes as the constituent material and the support layer forming material of this example will be described in detail.

As the constituent material and the support layer forming material, for example, a single powder of magnesium (Mg), iron (Fe), cobalt (Co) or chromium (Cr), aluminum (Al), titanium (Ti), copper (Cu), or nickel (Ni), or a mixed powder of an alloy containing at least one of these metals (maraging steel, stainless steel, cobalt chrome molybdenum, titanium alloy, nickel alloy, aluminum alloy, cobalt alloy, or cobalt chromium alloy), or the like can be used by making it a pasty mixed material containing a solvent and a binder.

Further, it is possible to use a general-purpose engineering plastic such as polyamide, polyacetal, polycarbonate, modified polyphenylene ether, polybutylene terephthalate, or polyethylene terephthalate. In addition, it is also possible to use an engineering plastic (resin) such as polysulfone, polyether sulfone, polyphenylene sulfide, polyarylate, polyimide, polyamideimide, polyetherimide, or polyether ether ketone.

As such, there is no particular limitation on the constituent material and the support layer forming material, and a metal other than the above described metals, a ceramic, a resin, or the like can also be used. Further, silicon dioxide, titanium dioxide, aluminum oxide, zirconium oxide, or the like can be preferably used.

Furthermore, it is also possible to use fibers such as cellulose.

Examples of the solvent include water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, isopropyl acetate, n-butyl acetate, and isobutyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetylacetone; alcohols such as ethanol, propanol, and butanol; tetraalkyl ammonium acetates; sulfoxide-based solvents such as dimethyl sulfoxide and diethyl sulfoxide; pyridine-based solvents such as pyridine, γ-picoline, and 2,6-lutidine; and ionic liquids such as tetraalkyl ammonium acetate (for example, tetrabutylammonium acetate), and one selected from these or a combination of two or more thereof can be used.

Examples of the binder include an acrylic resin, an epoxy resin, a silicone resin, a cellulose-based resin, or other synthetic resin, or a polylactic acid (PLA), a polyamide (PA), a polyphenylene sulfide (PPS), or other thermoplastic resin.

Next, an example of the production method for the three-dimensional shaped article carried out by using the formation apparatus 2000 will be described with reference to a flowchart.

Figure 13:
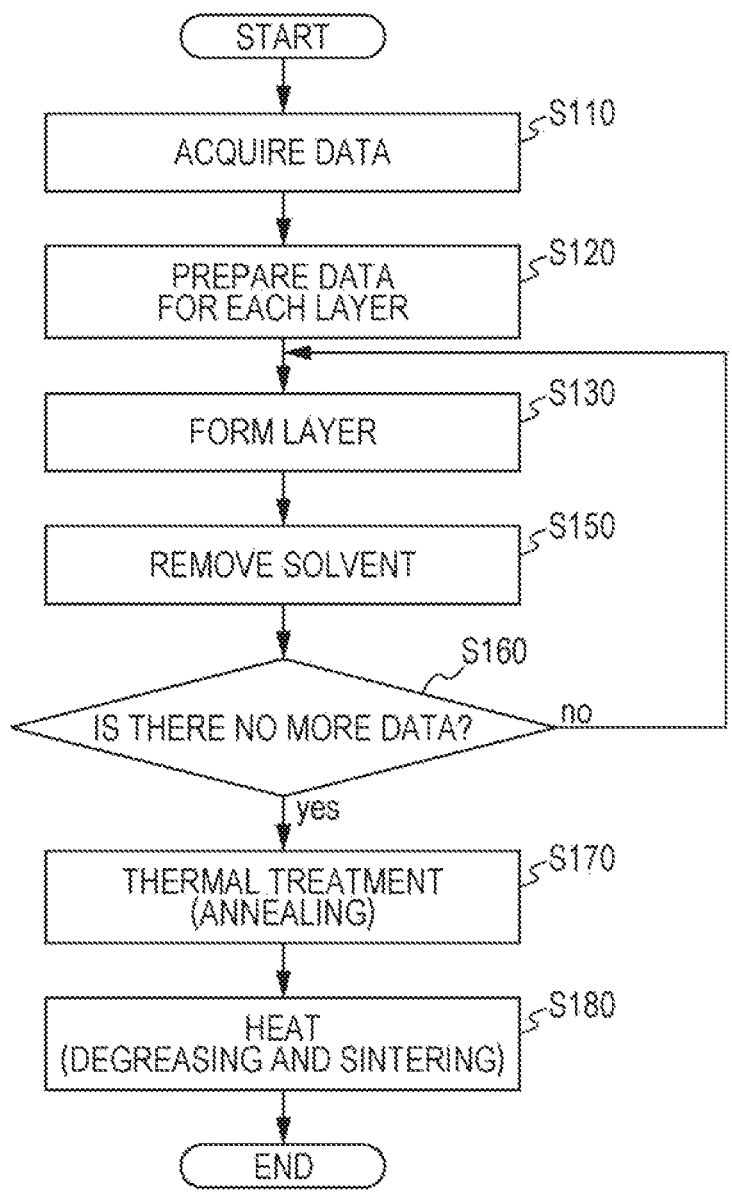
FIG. 13 is a flowchart of a method for producing a three-dimensional shaped article according to an example of the invention.

In this case, FIG. 13 is a flowchart for the production method for the three-dimensional shaped article according to this example.

As shown in FIG. 13, in the production method for a three-dimensional shaped article of this example, firstly, in step S110, data for the three-dimensional shaped article is acquired. Specifically, for example, data representing the shape of the three-dimensional shaped article is acquired from an application program or the like run on a personal computer.

Next, in step S120, data for each layer is prepared (generated). Specifically, in the data representing the shape of the three-dimensional shaped article, slicing is performed according to the shaping resolution in the Z direction, and bitmap data (sectional data) is generated for each section.

Next, in step S130, based on the data generated in step S120, the constituent material is discharged from the constituent material discharging section 1230 (in some cases, the support layer forming material is also discharged from the support layer forming material discharging section 1730) to form a layer (layer of three-dimensional shaped article 500) for one layer.

Next, in step S150, electromagnetic waves (infrared rays) are irradiated from the electromagnetic wave irradiating section 1000 to heat the layer of the three-dimensional shaped article 500 formed in step S130, thereby removing (volatilizing) the solvent contained in the constituent material.

In the method for producing a three-dimensional shaped article according to this example, the solvent is removed from the layer of the three-dimensional shaped article 500 by being irradiated with electromagnetic waves from the electromagnetic wave irradiating section 1000 so that the solvent is volatilized. However, the invention is not limited to such a method. For example, the solvent may be removed by irradiating the layer of the three-dimensional shaped article 500 with light, laser, or the like, or the solvent may be removed by using a hot plate or another heating mechanism. Furthermore, the solvent may be removed by depressurization of an atmosphere or by natural drying.

Then, steps S130 to S160 are repeated until a determination is made in step S160 whether shaping of the stack of the three-dimensional shaped article 500 based on the bitmap data corresponding to each of the layers generated in step S120 is completed.

In a case where the shaping of the stack of the three-dimensional shaped article 500 based on the bitmap data corresponding to each of the layers generated in step S120 by repeating steps S130 to S160 is completed, a thermal treatment (so-called annealing) is performed in step S170.

Specifically, for example, the stack of the three-dimensional shaped article 500 is moved to a constant temperature bath (not shown), and the stack is heated at a temperature that is equal to or higher than the glass transition temperature (Tg) of the binder contained in the constituent material in the constant temperature bath and is equal to or lower than the softening point thereof. It is noted that the thermal treatment method is not limited to such a method, and, for example, the thermal treatment may be performed inside the formation apparatus 2000 inside of which is provided with a heating mechanism capable of performing the thermal treatment. In addition, the heating temperature is not limited to the above-mentioned range. There is no particular limitation on an atmosphere inside the constant temperature bath, and a nitrogen atmosphere, a reducing gas atmosphere, or the like can be preferably adopted.

Then, in step S180, the stack of the three-dimensional shaped article 500 formed in the above step is heated, for example, in the above-mentioned constant temperature bath, to perform at least one of degreasing and sintering.

Along with the completion of step S180, the production method for the three-dimensional shaped article of this example is completed.

As described above, the method for producing a three-dimensional shaped article according to this example is a method for producing a three-dimensional shaped article in which the three-dimensional shaped article 500 is produced by stacking a plurality of layers (layers 501, 502, 503, . . . , 50n), the method including a layer formation step (step S130) of forming the layers by using a constituent material (material M) which is a composition that contains a powder, a solvent, and a binder which constitute the three-dimensional shaped article 500, a solvent removal step (step S150) of removing the solvent contained in the layers, a thermal treatment step (step S170) of applying heat to a stack of the three-dimensional shaped article 500 formed of a plurality of the layers obtained by performing the layer formation step and the solvent removal step, and a heating step (step S180) of carrying out at least one of degreasing and sintering with respect to the stack of the three-dimensional shaped article 500 that has been thermally treated in the thermal treatment step.

As described above, in the method for producing a three-dimensional shaped article according to this example, before the heating step of carrying out at least one of the degreasing and the sintering, the thermal treatment step of applying heat to the stack of the three-dimensional shaped article 500 (layers constituting the three-dimensional shaped article 500) is performed. Thus, even in a case where distribution of the solvent and the binder is biased in the solvent removal step, it is possible to reduce or eliminate the bias (stress caused by the bias) by the thermal treatment step. Therefore, in the method for producing a three-dimensional shaped article according to this example, it is possible to reduce or eliminate stress in the stack of the three-dimensional shaped article 500 before carrying out the degreasing and the sintering, and to prevent the stack of the three-dimensional shaped article 500 from being deformed due to the heating step (degreasing or sintering).

In the method for producing a three-dimensional shaped article according to this example, in the thermal treatment step of step S170, heat is applied to the stack of the three-dimensional shaped article 500 formed of a plurality of the layers obtained by performing the layer formation step and the solvent removal step. As a result, it is possible to reduce the number of times of performing the thermal treatment step, and it is possible to increase a production efficiency (production rate) of the three-dimensional shaped article 500. However, a method of applying heat to a layer of one layer obtained by performing the layer formation step and the solvent removal step in the thermal treatment step of step S170 (method in which the order of step S160 and step S170 is switched) may be adopted.

In addition, in the method for producing a three-dimensional shaped article according to this example, heat at a temperature equal to or higher than the glass transition temperature of the binder is applied in the thermal treatment step. Thus, even in a case where distribution of the binder is biased in the solvent removal step, it is possible to particularly effectively reduce or eliminate the bias by the thermal treatment step. Therefore, in the method for producing a three-dimensional shaped article according to this example, it is possible to particularly effectively reduce or eliminate stress within the stack of the three-dimensional shaped article 500 before carrying out the degreasing or the sintering, and to particularly effectively prevent the stack of the three-dimensional shaped article from being deformed due to the heating step (degreasing or sintering).

The temperature of the heat applied in the thermal treatment step is preferably a temperature which is the glass transition temperature of the binder+5° C., a temperature which is the glass transition temperature of the binder+10° C., or the like.

Furthermore, in the method for producing a three-dimensional shaped article according to this example, heat at a temperature equal to or lower than the softening point of the binder is applied in the thermal treatment step. Thus, it is possible to suppress deformation of the stack of the three-dimensional shaped article 500 which is caused by softening of the binder due to the thermal treatment step.

In this case, the constituent material is capable of containing a plurality of types of powders, solvents, and binders which constitute three-dimensional shaped article.

In a case where a plurality of types of binders are contained in the constituent material, heat at a temperature equal to or higher than the highest glass transition temperature among the binders contained in the constituent material can be applied in the thermal treatment step. By applying heat at such a temperature, even in a case where a plurality of types of binders are contained, it is possible to particularly effectively reduce or eliminate bias in distribution of the binders.

However, the invention is not limited to such a method. For example, in a case where a plurality of types of binders are contained in the constituent material, a method of applying heat at a temperature equal to or higher than the glass transition temperature of the binder having the highest content may be adopted.

In addition, in the method for producing a three-dimensional shaped article according to this example, the solvent removal step is a method which is performed every time the layer formation step is performed once. Since the layer formation step is performed every time the solvent removal step is performed once, this is a method capable of particularly effectively reducing bias in distribution of the binder due to the solvent removal step. However, the invention is not limited to such a method for producing a three-dimensional shaped article.

Hereinafter, a method for producing a three-dimensional shaped article (method for producing a three-dimensional shaped article in which the solvent removal step is performed after the layer formation step is performed a plurality of times), which is different from the method for producing a three-dimensional shaped article shown in FIG. 13, will be described with reference to FIG. 14.

Figure 14:
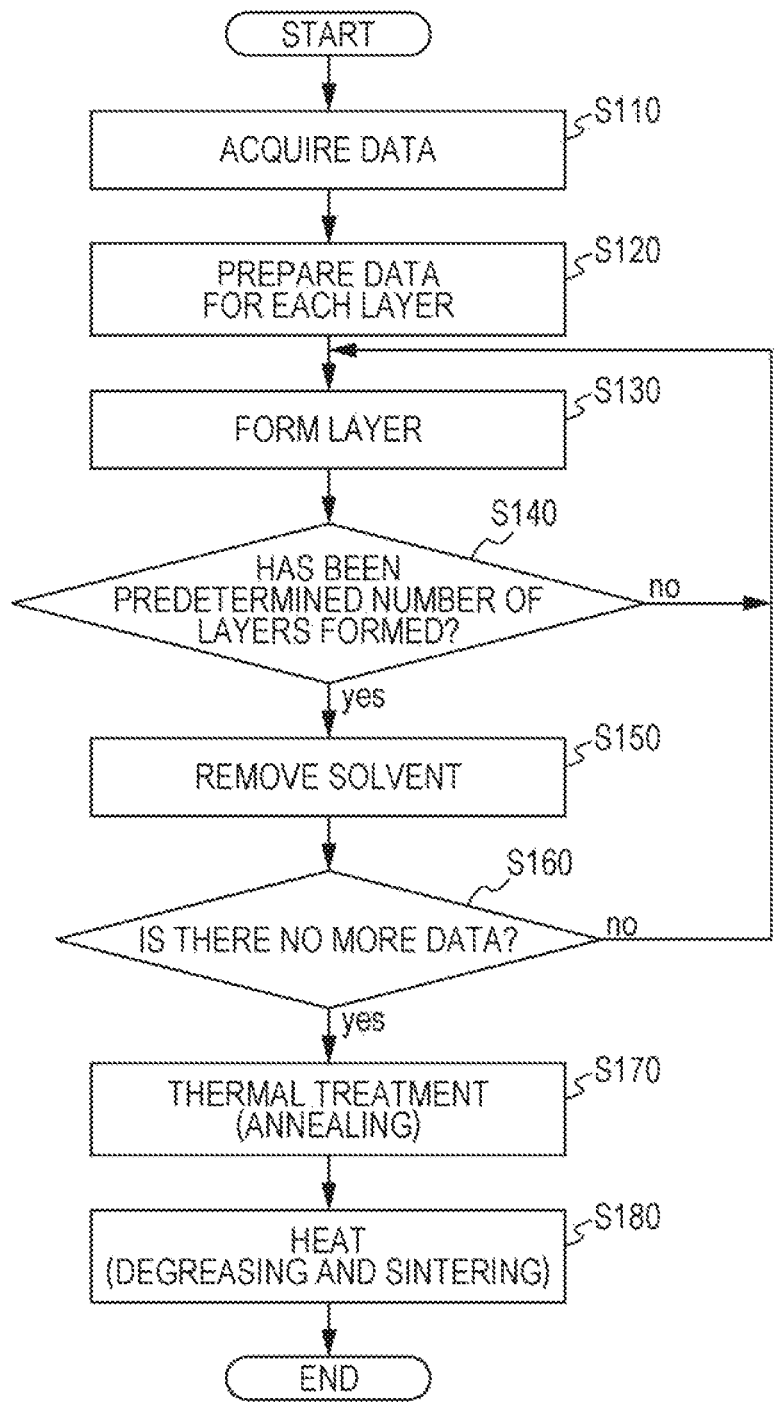
FIG. 14 is a flowchart of a method for producing a three-dimensional shaped article according to another example of the invention.

In this case, FIG. 14 is a flowchart of the method for producing a three-dimensional shaped article according to this example, in which step S140 (step of making a determination whether a predetermined number of layers has been formed) is performed between step S130 (layer formation step) and step S150 (solvent removal step), with respect to the method for producing a three-dimensional shaped article shown in FIG. 13. Since flows from step S110 to step S130 and from step S150 to step S180 are the same as the method for producing a three-dimensional shaped article shown in FIG. 13, detailed descriptions therefor will be omitted.

In the method for producing a three-dimensional shaped article according to this example, in step S140, a determination is made whether a predetermined number of layers has been formed during a period after completion of the layer formation step in step S130 until the solvent removal step proceeds in step S150. That is, step S130 is repeated until a predetermined number of layers are formed (until a stack having a predetermined thickness is formed).

In other words, in the method for producing a three-dimensional shaped article according to this example, the solvent removal step is performed after the layer formation step is performed a plurality of times. As described above, by performing the layer formation step after performing the solvent removal step a plurality of times, it is possible to reduce the number of performing the solvent removal step, and to increase a production efficiency (production rate) of the three-dimensional shaped article 500.

It is noted that the predetermined number (number of consecutively performing the layer formation step which is performed until the solvent removal step is performed) in step S140 may be a number which allows completion of formation of the stack of the three-dimensional shaped article 500. However, the number is not limited thereto, and may be twice or more.

The invention is not limited to the examples described above, and can be realized in various configurations without departing from the scope and spirit thereof. For example, the technical features in the examples corresponding to the technical features in the respective embodiments described in the "SUMMARY" section can be appropriately replaced or combined in order to achieve the advantages above described. Further, such a technical feature may be appropriately omitted unless it is described as an essential feature in the specification.

What is claimed is:

1. A method for producing a three-dimensional shaped article in which the three-dimensional shaped article is produced by stacking a plurality of layers, the method comprising:

forming the layers by using a composition that contains a powder, a solvent, and a binder which constitute the three-dimensional shaped article, the powder being a polymeric material;

removing the solvent contained in the layers;

performing a single thermal treatment in a constant temperature bath that applies heat at a temperature equal to or higher than a glass transition temperature of the binder and equal to or less than a softening point of the binder to the layers obtained by performing the forming of the layers and the removing of the solvent; and performing heating to carry out at least one of degreasing and sintering with respect to a stack of the three-dimensional shaped article that has been thermally treated in the performing of the single thermal treatment, wherein in the performing of the single thermal treatment, heat at the temperature equal to or higher than the glass transition temperature of the binder and equal to or less than a softening point of the binder is applied to the stack of the three-dimensional shaped article formed of the plurality of layers obtained by performing the forming of the layers and the removing of the solvent, and wherein, in a case where a plurality of types of the binders are contained in the composition, in the performing of the single thermal treatment, heat at a temperature equal to or higher than a highest glass transition temperature among the binders is applied.

2. The method for producing a three-dimensional shaped article according to claim 1, wherein the removing of the solvent is performed every time the forming of the layers is performed once.

3. The method for producing a three-dimensional shaped article according to claim 1, wherein the removing of the solvent is performed after the forming of the layers is performed a plurality of times.

* * * * *